Figure 1:
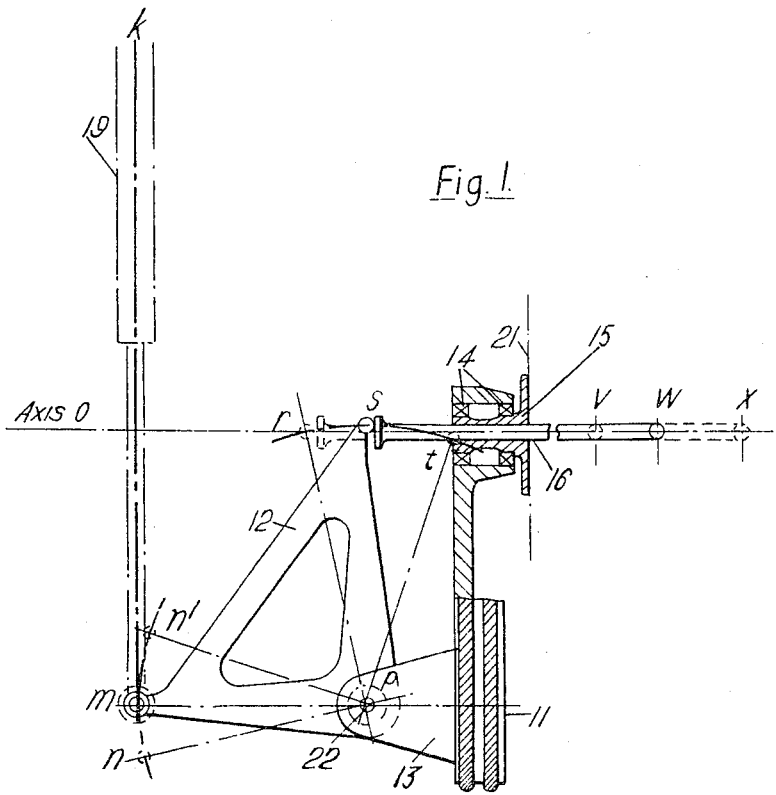

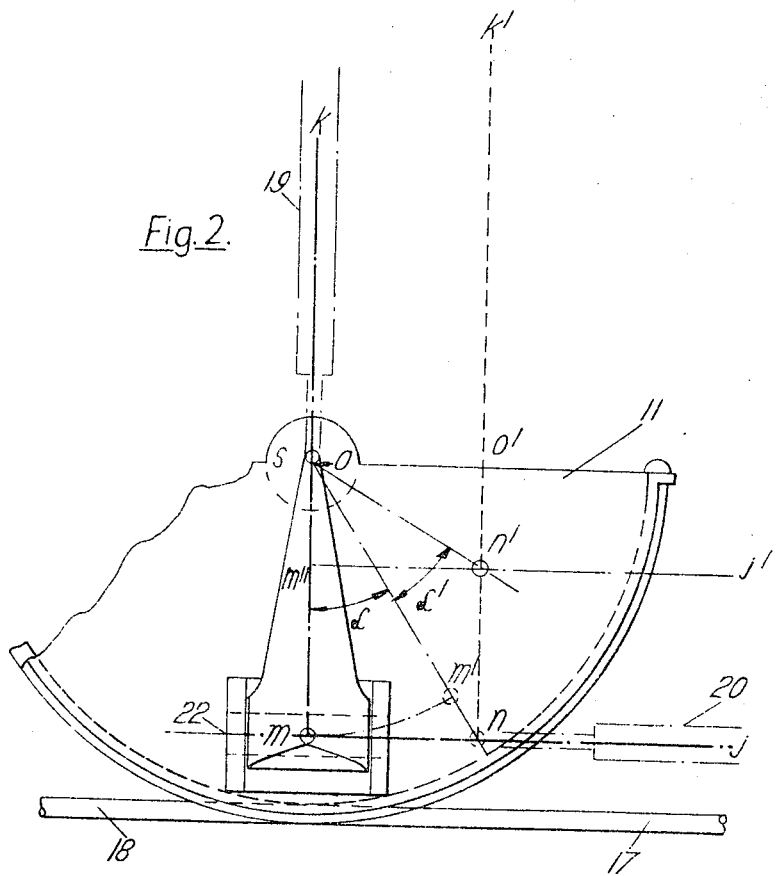

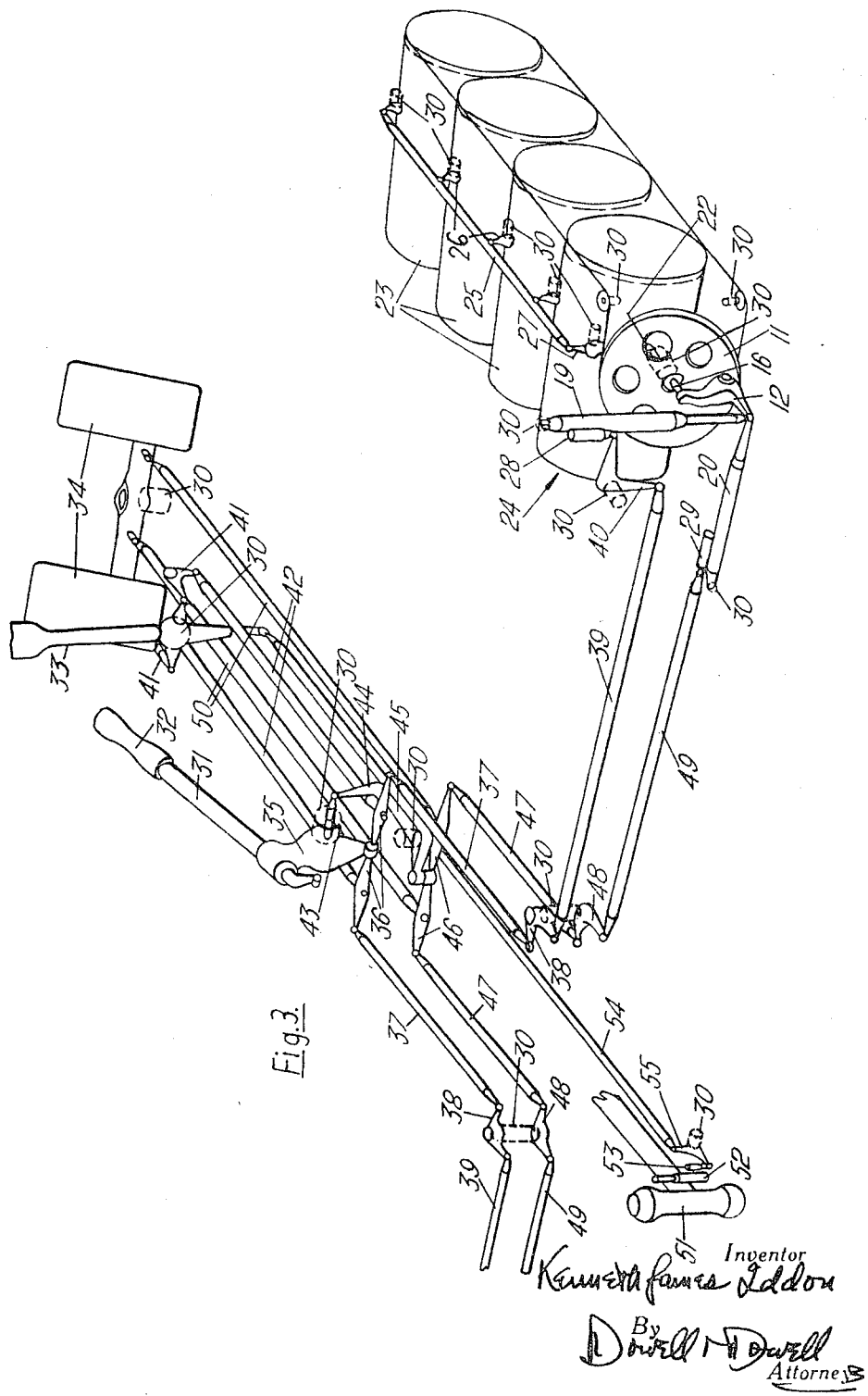

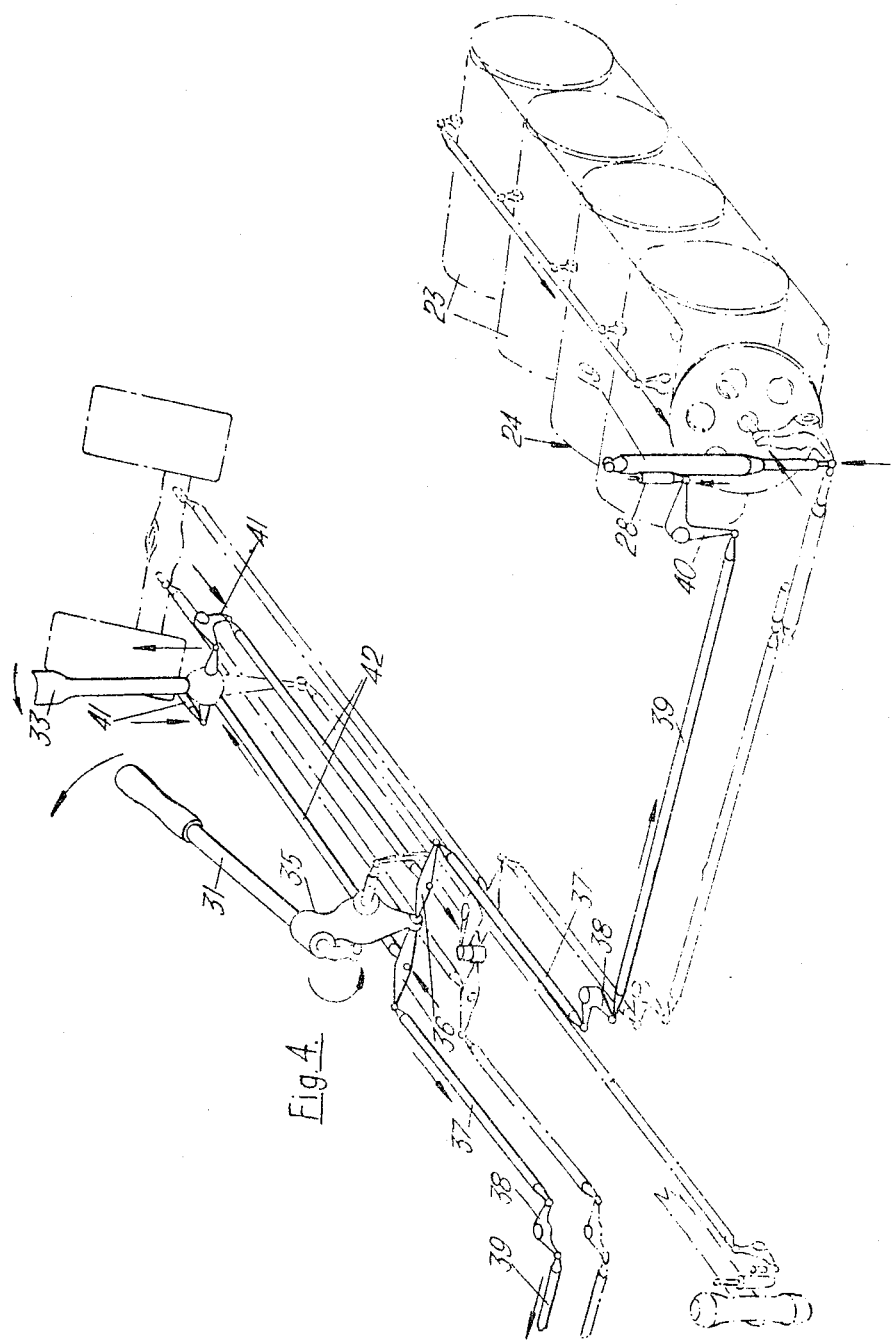

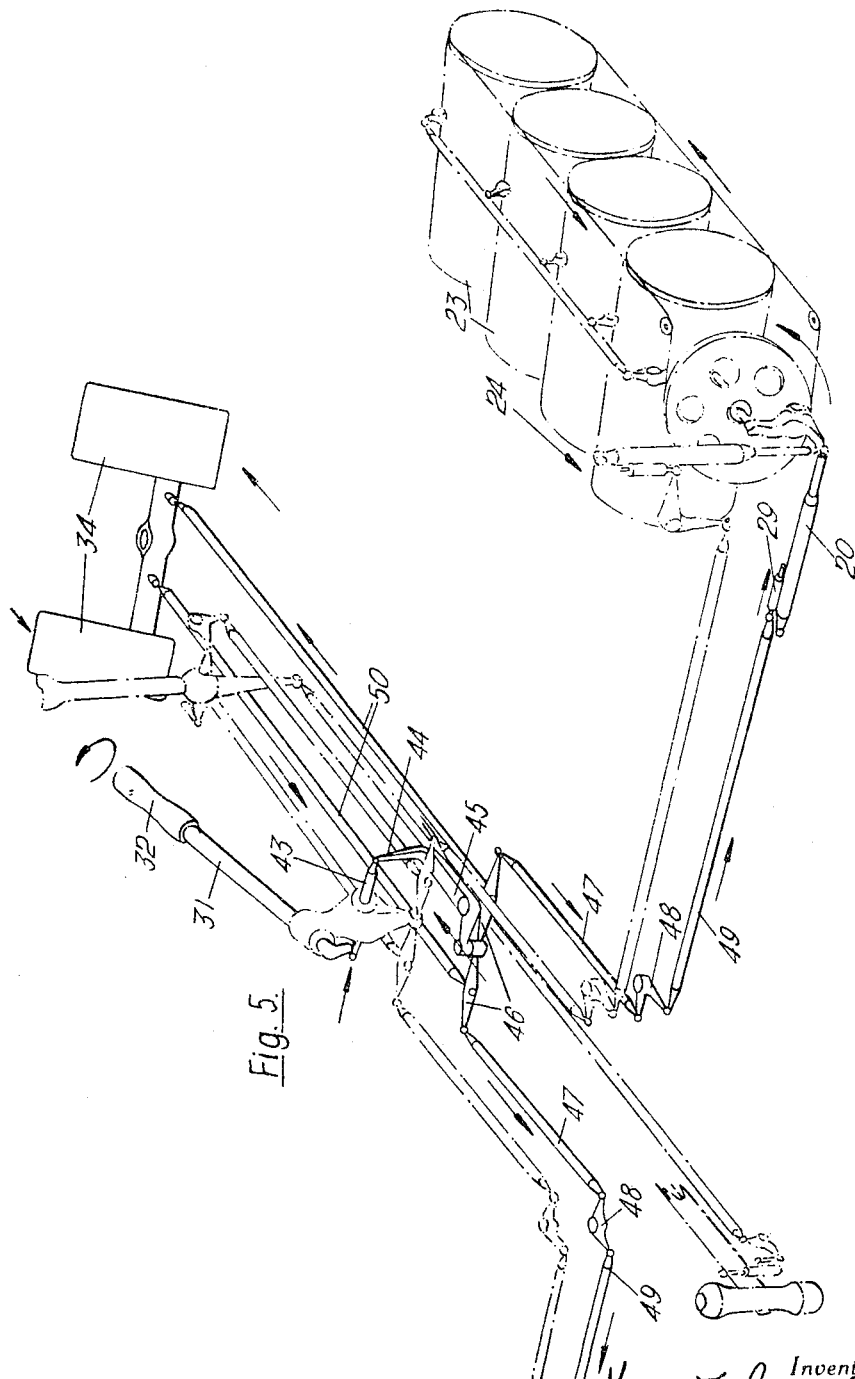

Nov. 1, 1966     K. J. IDDON     3,282,536
AIRCRAFT CONTROLS
Filed Aug. 20, 1964     6 Sheets-Sheet 6
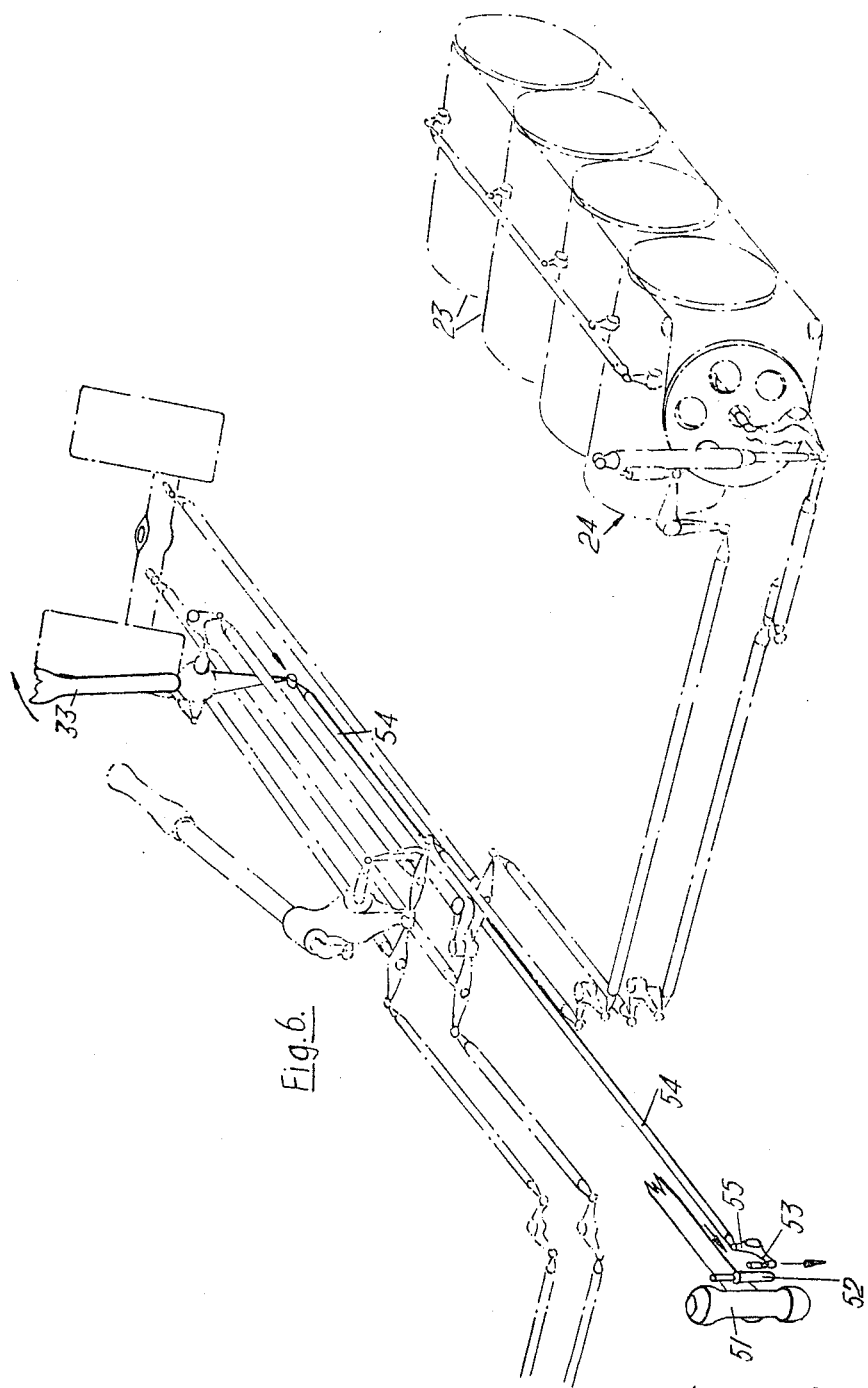

United States Patent Office 3,282,536
Patented Nov. 1, 1966

3,282,536
AIRCRAFT CONTROLS
Kenneth James Iddon, Send, Surrey, England, assignor to Hawker Siddeley Aviation Limited, London, England
Filed Aug. 20, 1964, Ser. No. 390,928
Claims priority, application Great Britain, Aug. 26, 1963, 33,713/63
9 Claims. (Cl. 244—75)

This invention relates to aircraft controls, more particularly controls for vertical or short take-off aircraft of the deflected or "vectored" thrust type.

In aircraft of this type a short or vertical take-off and landing capability is obtained by the provision of means for directing, at will, thrust produced by the aircraft power plant downwardly to give lift. That is to say at take-off and landing, when the aircraft forward speed is low or zero, the thrust, or a portion of the thrust, that propels the aircraft forward during normal cruising flight is downwardly directed, which may be variously achieved by tilting complete propulsion units or parts thereof or by the operation of deflectors or shutters that control the direction of propulsive air or gas streams issuing from the power plant. During the transition between the V/STOL mode and normal forward flight careful adjustments of both amount of propulsion unit thrust and the direction of that thrust need to be made together and the control task imposed on the pilot is quite severe.

According to one aspect of the present invention, a cockpit control is provided which is so arranged that the pilot can control the aircraft propulsion plant, both as regards throttle opening (which determines the amount of thrust) and the direction of thrust, with one hand. This leaves the pilot's other hand free to operate the control column that commands the attitude of the aircraft. The one-handed thrust control may conveniently be a throttle lever with a twist grip handle, angular adjustment of the lever as a whole giving one control movement while turning of the twist grip gives the second movement. The thrust control may also, if desired carry a further control element, such as a push button, for bringing into or out of operation any special components of the installation that appertain to the V/STOL mode of flight, such as changeover valves, cascades and the like.

According to another aspect of the invention the control transmission between the pilot's control means and the propulsion plant includes at least one resolver device to translate pilot's control movements, transmitted in terms of demands for changes in the vertical and horizontal thrust or velocity vectors, into the appropriate settings of engine throttle opening and engine thrust deflection angle, the device being arranged so that a change in pilot demand in respect of one vector will not cause any change in the velocity of the aircraft in the direction normal to the modified vector. This is of considerable benefit since it is more natural for the pilot to "think" of horizontal and vertical velocities rather than the correlation of throttle setting and jet or nozzle deflection angle, so again the control burden is eased substantially.

According to a further aspect, means are provided in the transmission between the pilot's control and the propulsion plant for summing with or superimposing on the horizontal and vertical thrust or velocity control signals, attitude control signals from the pilot's attitude controls, e.g. from the control column and rudder pedals. This will ordinarily involve combining yaw control signals, from the rudder pedals, with the horizontal thrust or velocity control signals, and roll control signals, from the control column, with the vertical thrust or velocity control signals. The combined signals may then be translated into throttle settings and jet or nozzle deflection angles by the aforementioned resolver device or devices.

In a large multi-engined aircraft there will preferably be two resolver devices, for port and starboard control, respectively. Also it may be preferable for two pilots to share the manual control functions in the V/STOL mode, one being responsible for attitude and the other for lift and propulsive thrust, with the control movements of the two being combined in the transmission as aforesaid.

To better illustrate the nature of the invention and its application in practice there will now be described, by way of example, a control system embodying it, this system being planned for a comparatively large multi-engined aircraft having two rows of lift engines on the port and starboard sides, respectively, and a resolver device associated with each row. Reference will be had to the accompanying drawings, in which:

FIGURES 1 and 2 are diagrams of a resolver device, seen in elevation in two directions mutually at right angles, to illustrate the principle of its operation, FIGURE 3 is a perspective diagram of the complete control system, and FIGURES 4 to 6 are diagrams corresponding to FIGURE 3, for the purpose of better explaining the various control functions.

FIGURES 1 and 2 illustrate diagrammatically the principle of operation of the resolver portion of the control equipment. A cable pulley sector 11 is mounted to turn in the same plane as the engine nozzles, i.e. the vertical plane, about a horizontal axis $o$. The axis $o$ is fixed with respect to the aircraft, the sector 11 being supported on bearings 14 which are in turn carried by, for example, a mounting member 15 secured to a bulkhead 21 of the aircraft. Out near the periphery of the sector 11 there is fixed to it a bracket 13 which provides a pivotal mounting for a rocking arm 12 of generally triangular configuration. The axis 22 about which the arm 12 rocks on the bracket 13 lies parallel to the general plane of the sector and at right angles to a radius thereof.

Point $p$ on the axis 22 being one corner of the triangle represented by the arm 12, the other two corners are a point $s$ above the point $p$ in the region of the sector axis $o$, and a point $m$ at about the same level as the point $p$ and farther out from the sector, the lines $sp$ and $mp$ both being at right angles to the axis 22. A push rod 16 slides in the mounting member 15 along the axis $o$ and is spring-loaded into contact with the arm 12 at the point $s$. The opposite end $w$ of this rod is connected to a linkage operating the engine throttle mechanism, which linkage is arranged so that movement of the rod 16 in the direction from $s-w$ to a new position $r-v$ causes an increase in engine thrust.

Two cables 17, 18 run from the periphery of the sector 11 to mechanisms for angularly adjusting the engine nozzles, the arrangement being such that an angular movement of the sector 11 produces a corresponding angular movement of the nozzles of equal magnitude and in the same direction.

Two piston-and-cylinder units or actuator jacks 19, 20 are coupled to the point $m$ on the arm 12. The actuator 19 is truly vertical above the point $m$, while the actuator 20 is horizontal and parallel to the plane of rotation of the sector 11. These actuators are fed with input signal movements from the human pilot or the automatic stabiliser system, the signals constituting vertical and horizontal demands, respectively.

Consider the mechanism as set up in FIGURES 1 and 2, with the actuators 19 and 20 locating the operating point $m$ on the arm 12 vertically below the centre of rotation represented by the axis $o$. This configuration corresponds to the engine nozzles being directed vertically downwards; the distance of the point $m$ below the axis $o$ determines the angular position of the arm 12 about the axis 22 which in turn locates the axial position of the rod 16 and so fixes the throttle setting.

If the pilot now initiates a demand for a horizontal forward acceleration this causes a change of length of the actuator 20. As the actuators 19 and 20 are arranged to remain always vertical and horizontal respectively, the operating point $m$ will move to the new position $n$ and the vertical actuator 19 will move from the position $k$–$m$ to the position $k'$–$n$ (FIGURE 2) with no change of extension, the original condition of pilot input to this actuator not having been modified. The movement of the point $m$ to $n$ causes a rotation of the sector 11 through the angle $\alpha$ which operates the engine nozzles through the same angle via cables 17 and 18 and so creates a horizontal component of thrust to answer the pilot's demand for horizontal acceleration. At the same time, the horizontal movement of $m$ to $n$ causes a lengthening of the dimension $o$–$m$ from $o$–$m'$ to $o$–$n$. This is accompanied by an angular movement of the arm 12 as best seen in FIGURE 1, such that point $m$ moves to $n$, point $s$ moves to $r$ and point $w$ moves to $v$. An increase in engine throttle setting, equivalent to the extension of $o$–$m'$ to $o$–$n$, therefore occurs in spite of the fact that the vertical demand actuator 19 has not altered its input signal, i.e. its degree of extension. The resulting increase in thrust from the engines maintains the vertical component of thrust at its original value, so that the effect on the aircraft is only that demanded by the pilot, i.e. a change of horizontal velocity and no change in vertical velocity. It will be understood that, for any position of the point $m$, the vertical and horizontal distances from $o$ to $m$ can be considered as vectors representing, respectively, the vertical and horizontal components of thrust on the aircraft.

The operation is similar for vertical velocity changes, as typified in FIGURE 2 by a reduction of the vertical actuator length from $k'$–$n$ to $k'$–$n'$, and a movement of the horizontal actuator, without change of extension, from $j$–$n$ to $j'$–$n'$. This causes an angular rotation of the sector 11 through the angle $\alpha'$ and a shortening of the length $o$–$n$ to length $o$–$n'$. The arm 12 therefore rotates so that point $r$ moves to $t$, and point $v$ moves to $x$, causing reduction in throttle setting. The final vector lengths are such that horizontal length $m$–$n$ is maintained the same ($m''$–$n'$) while the vertical vector length represented by $o'$–$n$ is reduced, according to the pilot's demand signal, to that required, i.e. $o'$–$n'$.

Whereas in the foregoing description it has been assumed, for the sake of simplicity in explanation, that the sector of the resolver operates in a plane parallel to the plane of movement of the engine nozzles, and that the vertical and horizontal input actuators are indeed physically vertical and horizontal respectively, it will be understood that this is by no means an essential requirement. Providing the mutual geometrical relationships are observed, and the motions are coupled to the engine throttles and the nozzle deflecting means in appropriate manner, the resolver as a whole may be orientated in any way that is best suited to the space available to accommodate it.

Referring now to FIGURE 3, this shows the general layout of the V/STOL control system of the aircraft.

The aircraft has four port and four starboard lift engines, only the starboard engines 23 being shown in the drawing. The engines may advantageously be disposed in pods on the wings; in the arrangement shown the four engines on either side are mounted in a row along the pod and they lie alongside one another with their axes horizontal and transverse to the longitudinal axis of the aircraft. The end of each engine from which the thrust jet issues is outboard and the jet is turned through substantially a right angle by a dirigible nozzle on the tail of the engine. The nozzle being angularly adjustable, for example about the axis of the engine, the thrust jet can be directed at will either vertically downwardly, or horizontally rearwardly, or both downward and rearward, or indeed downward and forward, to supply lift and horizontal propulsive thrust in such combinations as may be desired.

Two resolvers 24, controlling the engines in accordance with the principle explained in connection with FIGURES 1 and 2, are disposed one in each pod at the rear end of the row of engines. Only the starboard resolver appears in the drawings. In this instance the resolver 24 is shown as having a full circular pulley wheel 11, instead of merely a sector, and the axis of rotation $o$, while horizontal, is substantially at right angles to the axes of rotation of the engine nozzles. The plane of the angular motion is changed between the resolver and the nozzles by leading each of the cables 17, 18 round horizontally through a right angle. A common adjusting link 25 for all the engine throttles 26 is coupled to the push rod 16 of the resolver by a lever 27.

The actuator jacks 19, 20 of the resolver 24 are controlled by servo valves 28, 29 to which input movements are applied from the pilot's controls. It may here be mentioned that in FIGURE 3 of the drawings the points where the various links, levers and other components of the system have pivotal mountings on fixed parts of the aircraft structure are all denoted by the reference numeral 30.

The primary control member used by the pilot to control the lift engines is a lift lever 31. This can be moved back and forth to vary the control input to the servo valve 28 of the vertical actuator jack 19 of each resolver, and it also has a twist-grip 32 for varying the input to the servo valve 29 of the horizontal jack 20. Thus back and forth movement of the lift lever 31 adjusts principally the engine throttle setting, while operation of the twist-grip 32 adjusts principally the nozzle deflection.

In addition to the lift lever 31 the pilot has more conventional controls in the form of a control column 33 and rudder pedals 34. For the V/STOL mode of flight movements of these controls are super-imposed on the control inputs from the lift lever 31 to the resolvers 24. Thus, sideways movements of the control column 33 affect the inputs to each vertical resolver jack 19, and movements of the rudder pedals 34 are transmitted to the horizontal resolver jacks 20.

Considering now FIGURE 4, this illustrates how the system operates in control of lift and roll. For clarity, the control transmission components involved are shown in full lines and the remainder in broken lines. Back and forth movements of the lift lever 31 cause a mounting member 35 of this lever to rock in the vertical longitudinal plane and this is translated by a pair of links 36 into equal longitudinal movements of rods 37. The motion is transmitted, again in equal amounts, by way of bell crank levers 38, lateral rods 39 and bell crank levers 40 to the valves 28 of the vertical resolver jacks, whereby equal changes in the engine throttle settings on both the port and starboard sides are produced (and equal changes in nozzle deflection, if any).

Sideways movements of the column 33, to control the aircraft in roll, are transmitted, in equal amounts but opposite senses by bell crank levers 41 and longitudinal rods 42 to the links 36 which in turn move the rods 37 by equal amounts but in opposite directions. This type of control movement therefore increases the throttle settings on one side of the aircraft and correspondingly reduces the throttle settings on the opposite side. It will be seen that the links 36 are mechanical adding links whereby the roll control movements of the column 33 are superimposed on the primary lift control applied by the lift lever 31. When the links 36 are shifted by the member 35 they turn about the rear ends of the rods, and when they are shifted by the rods 42 they turn about the lower end of the member 35.

FIGURE 5 illustrates operation of the system in control of horizontal acceleration and yaw. Again, the transmission components involved are in full lines and the remainder in broken lines. Turning of the twist-grip 32 on the lift lever 31 produces axial movement of a lateral rod 43 passing through the pivot of the lever mounting member 35. The rod 43 is pivotally connected to the upturned end 44 of one arm of a bell crank lever 45 which transmits the motion to the articulation point of a pair of links 46. From the links 46 the motion is transmitted, equally and in the same sense, to the valves 29 of the horizontal resolver jacks 20 by means of longitudinal rods 47, bell crank levers 47 and lateral rods 49. The twist-grip 32 therefore produces equal angular changes, of the same sense, in nozzle deflection on both sides of the aircraft (and equal changes in throttle setting, if any).

Movements of the rudder pedals 34 are applied equally but in opposite senses to the links 46 by longitudinal rods 50, the links 46 acting as mechanical adding links like the links 36 in the lift and roll system. Consequently, the rudder pedals bring about equal opposite changes in nozzle deflection on the two sides of the aircraft, resulting in a differential horizontal thrust component to produce yawing.

FIGURE 6 illustrates control in pitch, the control transmission components involved again being the only ones shown in full lines. Pitch control in the V/STOL mode is achieved by means of a vertically-directed nozzle 51 at the tail of the aircraft which is supplied with air or gas bled from the engines. The supply to the nozzle 51 is regulated by the valve which is adjusted by a servo jack 52, and fore and aft control movements of the control column 33 are transmitted to the servo valve 53 of the jack 52 by a rod 54 and bell crank lever 55.

By means of the arrangements described the burden on the pilot during the V/STOL flight mode is considerably reduced. The pilot only has to "think" in the comparatively single terms of vertical and horizontal accelerations and velocities and the translation of his demands in these terms is performed automatically by the control system without that system itself becoming unduly complex or departing from the realm of robust mechanical and hydraulic engineering.

Nevertheless considerable departures from the arrangements described are possible within the scope of the invention. The layout of the control transmissions is capable of much variation, and in particular to the resolvers can be housed elsewhere than in the engine pods. The resolvers themselves may be of another type, for example electrical, and the invention is not restricted to the use of twin resolvers or indeed to multi-engined arrangements.

Whereas the manual operation of the controls has been described in terms of a single pilot there is the possibility especially if the aircraft is of a comparatively large multi-engined type, of joint control by pilot and co-pilot, the one to operate the control column and rudder pedals and the other the lift lever. Moreover, if such a control method were employed the two-in-one control function provided by the lift lever and its twist grip could be divided for performance by quite separate control members.

What I claim is:

1. A flying control system for a V/STOL aircraft of the vectored thrust type, wherein the control transmission between the pilot's control means and the propulsion plant includes at least one resolver device to translate pilot's control movements, transmitted in terms of demands for changes in the vertical and horizontal thrust or velocity vectors, into appropriate settings of engine throttle opening and engine thrust deflection angle, the device being arranged so that a change in pilot demand in respect of one vector will not cause any change in the velocity of the aircraft in the direction normal to the modified vector, said resolver device comprising two orthogonally-disposed actuators to which the pilot's vertical and horizontal command signals are respectively applied and which have a common coupling point, and angularly moving members connected to said common coupling point and arranged to deliver, in response to movements of said coupling point, a first output in the form of an angular deflection to control the angular direction of engine thrust, and a second output in the form of a rectilinear displacement to control engine throttle setting.

2. In a flying control system as set forth in claim 1, the resolver device being arranged so that a change in pilot demand in respect of one of said vertical and horizontal vectors will not cause any change in the velocity of the aircraft in the direction normal to the modified vector, and comprising a pilot's control column and rudder petal means, first operative connections extending between said contol column means and rudder pedal means and said resolver device, and second operative connections extending from said resolver device to aircraft propulsion plant.

3. A system according to claim 1, wherein the resolver device comprises a first member moving angularly in a plane parallel to the plane of the axes of the orthogonally-disposed actuators, and a second member mounted on said first member for angular movement relative thereto in a plane at right angles to the plane of movement of the first member and containing the axis about which the first member turns, the common coupling point being located on said second member at a position displaced, along the general direction of said first axis of turn, from the axis about which the second member turns relative to the first member.

4. A system according to claim 3, wherein the rectilinear displacement output is obtained from a rod that engages the second angularly-moving member at a point lying on the axis about which the first angularly-moving member turns, the rod being mounted to slide endwise along that axis.

5. In a flying control system for a V/STOL aircraft having a power plant with dirigible jet nozzles, a resolver device comprising a first angularly-movable member movable about a first axis, a second angularly-movable member pivotally-mounted on the first said member to turn about an axis offse from and at right angles to said first axis, first and second actuator jacks disposed with their longitudinal axes in mutually orthogonal relationship and in a common plane parallel to the plane of movement of said first member and spaced from said second axis, said actuator jacks having a common point of coupling to said second angularly-movable member, first control means to apply a first pilot's control input to the first of said actuator jacks, second control means to apply a second pilot's control input to the second of said actuator jacks, first operative connections coupling one of said angularly-movable members to at least one of said dirigible jet nozzles of the aircraft power plant to control the jet direction thereof, and second operative connections coupling the other of said angularly-movable members to control the thrust output of the power plant.

6. A resolver device according to claim 5, wherein said first angularly-movable member is coupled to the dirigible jet nozzle and said second angularly-movable member is coupled to a respective engine throttle.

7. A resolver device according to claim 6, wherein said second operative connections comprise a rod movable endwise along said first axis and in operative engagement with said second angularly-movable member.

8. A resolver device according to claim 5, wherein said second axis lines intermediate said first angularly-movable member and the plane containing the longitudinal axes of the actuators.

9. In a flying control system for a V/STOL aircraft having port and starboard groups of lift engines with dirigible jet nozzles, the provision of two resolver devices according to claim 5, one for each of said groups of engines.

References Cited by the Examiner

UNITED STATES PATENTS 2,762,584  9/1956  Price _____ 244—12

FOREIGN PATENTS 677,732  1/1964  Canada.

MILTON BUCHLER, *Primary Examiner.*

ANDREW H. FARRELL, *Examiner.*